Patented Nov. 25, 1952

2,619,452

UNITED STATES PATENT OFFICE 2,619,452

PURIFICATION OF VINYL SULFONIC ACIDS

Giffin D. Jones, Easton, Pa., and Carl E. Barnes, Belvidere, N. J., assignors to General Aniline & Film Corporation, New York, N. Y., a corporation of Delaware No Drawing. Application December 22, 1945, Serial No. 637,037

2 Claims. (Cl. 202—39)

This invention relates to improvements in the purification of vinyl sulfonic acid and certain of its derivatives.

Vinyl sulfonic acid, $CH_2=CHSO_3H$, is a syrupy liquid which may be polymerized to translucent polymers. However, it has but limited application as a starting material for the preparation of translucent polymers due to its tendency to undergo discoloration in the air. This discoloration shows up in a more pronounced manner upon polymerization, in illustration of which it may be cited that even though a colorless or nearly colorless monomer be taken, the ensuing polymer will be brownish in color. This valuable property of forming translucent polymers, but likewise the disability of tending to become discolored in the air, is also possessed by the α-alkyl vinyl sulfonic acids, by the α-halo vinyl sulfonic acids and by the esters, amides and acid halides of these substituted vinyl sulfonic acids and of vinyl sulfonic acid, itself.

It is an object of the present invention to provide colorless monomers of the kind described and a process for their preparation.

We have found that the afore-described discoloring of the monomers, the result of which is to be found in the polymers, is due to impurities introduced through exposure of the monomers to oxygen, an effect which is accentuated at elevated temperatures.

The production of polymers from the colorless monomers is claimed in a divisional application, S. N. 724,472, filed January 25, 1947, now Patent No. 2,515,714 granted July 18, 1950.

We have further found that these impurities which give rise to color in the monomers may be removed therefrom and colorless monomers obtained by distilling the monomers in the absence of oxygen. The distillation is carried out under low pressures, for example, pressures of a few millimeters of mercury.

This procedure of operating in the absence of oxygen, we have also found to obtain for the polymerization of the purified monomers where colorless polymers are to be prepared. In accordance with the invention therefore, the polymerization of the purified colorless monomers also is conducted in the absence of oxygen. The monomers may be preserved in their purified colorless condition prior to being subjected to polymerization, by sealing the monomer in the receiver employed for its collection in the distillation, i. e., in the absence of oxygen.

The term, in the absence of oxygen, as used herein has reference to conditions wherein no oxygen is available for reaction with the monomer. The term does not, however, exclude the presence of such small amounts of oxygen which through the formation of the peroxide become combined with the monomer. In such case the oxygen being bound to the monomer is not available for the reaction which develops the color-forming impurities in the monomer.

The polymerization of the purified monomers may be assisted by suitable polymerization catalysts such as ultra violet light or small amounts of stable organic peroxides, i. e., those which do not give off oxygen under the conditions of the polymerization. Among the organic peroxides which may be thus employed are, for example, benzoyl peroxide, acetyl peroxide, lauroyl peroxide, etc.

In contrast to the behavior of the monomers, the polymers are relatively stable bodies and, where prepared as colorless bodies in the manner herein described, will remain colorless under ordinary conditions for a considerable length of time.

For the preparation of pure colorless polymers the purification process is applied to the monomers in the dry state and free from substances which may have been associated therewith other than, of course, the color-forming bodies present therein. Specific monomers in addition to vinyl sulfonic acid to which the process may be applied, are, for example, the α-alkyl vinyl sulfonic acids such as α-methyl vinyl sulfonic acid, the α-halo vinyl sulfonic acids such as α-chlorvinyl sulfonic acid and α-bromvinyl sulfonic acid, and the esters, amides and acid halides of vinyl sulfonic acid and of the α-substituted vinyl sulfonic acids, e. g., vinyl sulfonic acid ethyl ester, vinyl sulfonic acid phenyl ester, vinyl sulfonamide, α-methyl vinyl sulfon-methylanilide, vinyl sulfonyl chloride, α-methyl vinyl sulfonyl chloride, etc.

The purification of the monomers, and the polymerization thereof in the absence of oxygen, is further illustrated by the following specific examples, to which, however, it is not intended that the invention be limited. Parts are by weight.

*Example 1*

Into a distillation apparatus consisting of a modified Claisen distilling flask, a condenser, a magnetic fraction cutter, and receivers, all sealed together without the use of joints, and in which the temperature is read in a thermometer well, was charged an HCl free aqueous solution of vinyl sulfonic acid obtained in the preparation of the monomer from ethylene disulfonyl chloride by reaction with water. The apparatus was then evacuated, flushed with oxygen-free nitrogen and re-evacuated.

The distillation was initiated at atmospheric pressure, water being distilled from the mixture. In proportion as the water was taken off the pressure on the mixture was decreased, until, after all the water was removed, it stood at a few millimeters of mercury. The receiver for the water was cut out and that for the distilled monomer cut into the vapor line by means of the magnetic vapor cutter. The only opening in the apparatus led through traps to a high vacuum pump. The distilled product was a completely colorless liquid, boiling point 114–115° C. at 0.5 mm.; $n_D^{25}$ 1.4499.

Employing an apparatus similar to the above but provided with ground glass connections and carrying out the same distillation therein, red streaks appeared in the joints where the air entering through a pin hole came into contact with the hot vapor of the vinyl sulfonic acid. As the distillation proceeded, the distillate became pink and a considerable amount of black charred material appeared in the still and around the thermometer.

*Example 2*

Vinyl sulfonic acid not exposed to air and sealed in vacuo in the tube which was used as the receiver for the distilled monomer in the previous example was polymerized by exposure to ultra violet light overnight at about 40° C. yielding a clear colorless polymer.

When vinyl sulfonic acid, purified as in Example 1, was exposed to the air briefly, placed in a tube, the tube evacuated, flushed with oxygen-free nitrogen, re-evacuated and sealed, and the exposed monomer therein polymerized under similar conditions, the polymer was tan in color. On baking for 6 hours at 100° C., it became dark brown.

Where color may not be of prime importance, it is still advantageous to purify the monomer and to polymerize it in the absence of oxygen in order to improve the yield in the distillation as well as the physical properties of the polymer insofar as they are related to the molecular weight in the polymer.

As various other embodiments of the invention will occur to those skilled in the art, it is not intended that the scope of the patent be limited except as is required by the prior art and the appended claims.

We claim:

1. A process of purifying a monomer selected from the class consisting of vinyl sulfonic acid, $\alpha$-alkyl vinyl sulfonic acids, $\alpha$-halo vinyl sulfonic acids and the esters, amides and acid halides of these vinyl sulfonic acids which comprises preventing the contact of the monomer with oxygen by flushing with nitrogen, distilling the monomer in the dry state at low pressures in an oxygen-free atmosphere and maintaining the distilled monomer out of contact with oxygen.

2. The process of claim 1 wherein the monomer is vinyl sulfonic acid.

GIFFIN D. JONES.
CARL E. BARNES.

REFERENCES CITED

The following references are of record in the file of this patent:

UNITED STATES PATENTS

| Number | Name | Date |
|---|---|---|
| 2,348,705 | Alderman et al. | May 16, 1944 |
| 2,383,120 | Fessler | Apr. 21, 1945 |

FOREIGN PATENTS

| Number | Country | Date |
|---|---|---|
| 549,234 | Great Britain | Nov. 12, 1942 |

OTHER REFERENCES

Starr, "Safety Precaution in Manufacturing Butadiene," National Petroleum News, Nov. 3, 1943, pages R–521, R–522, R–523.